May 1, 1923.

J. M. MYLROIE

TIRE MAKING MACHINE

Filed July 28, 1919

1,453,763

Inventor
John M. Mylroie

By
his Attorney

Patented May 1, 1923.

1,453,763

UNITED STATES PATENT OFFICE.

JOHN M. MYLROIE, OF AKRON, OHIO, ASSIGNOR TO THE GOODYEAR TIRE & RUBBER COMPANY, OF AKRON, OHIO, A CORPORATION OF OHIO.

TIRE-MAKING MACHINE.

Application filed July 28, 1919. Serial No. 313,958.

*To all whom it may concern:*

Be it known that I, JOHN M. MYLROIE, a citizen of the United States, and resident of Akron, Ohio, have invented new and useful Improvements in Tire-Making Machines, of which the following is a specification.

My invention relates to improvements in pneumatic tire making machines and has particular reference to a machine for stitching or shaping the fabric wound on a core to form the tire casing.

The main object of my invention is to provide a machine which will, in a satisfactory manner, shape or "stitch" the fabric in place on the core, without the formation of wrinkles, and so that the fabric will adhere closely to the form of the core, producing a smooth surface.

A further object of my invention is to provide a machine wherein the stitching elements are automatically maintained in definite and proper relation to the core and the fabric wound thereon.

The above and additional objects and advantages of a similar nature, which will be hereinafter more specifically treated, are preferably accomplished by such means as are illustrated in the accompanying drawings, described in the following specification, and then more particularly pointed out in the claims which are appended hereto and form a part of this application.

In the drawings wherein I have illustrated a preferred embodiment of my invention, and in which like reference numerals designate like or corresponding parts:

Figure 1:
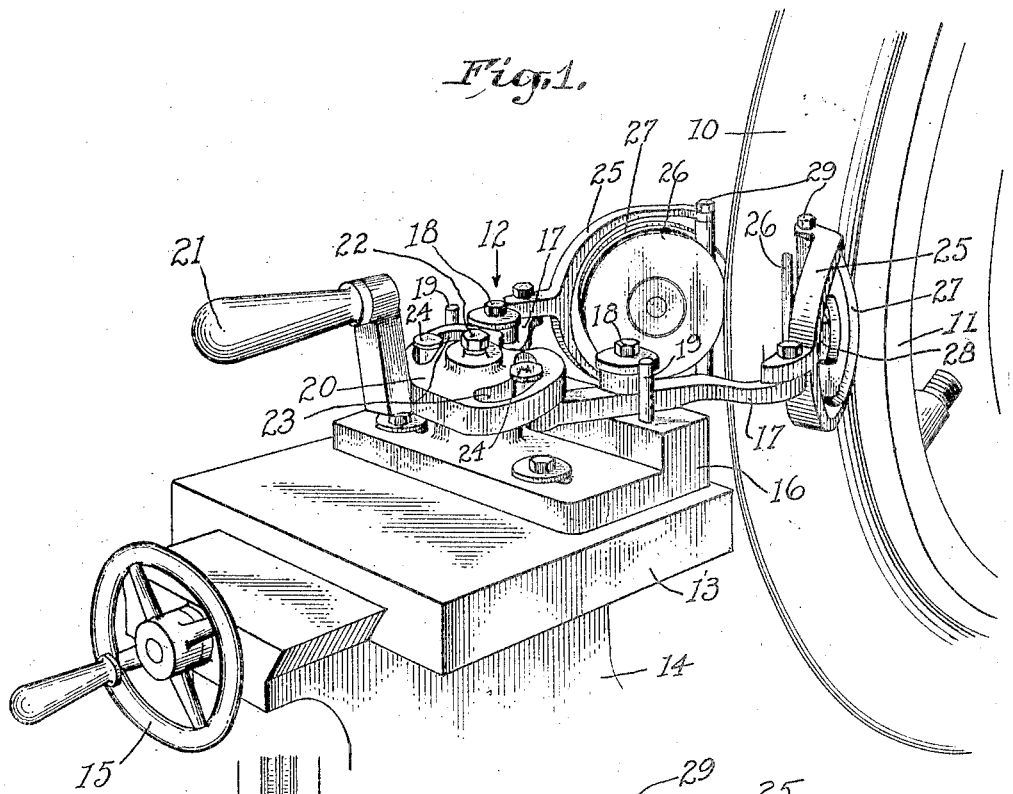
Figure 1 is a perspective view of my improved device as applied to a tire forming machine.

A core 10 is suitably mounted for rotation on a chuck 11 of usual construction. On this core the fabric is wound in the usual manner, the means for winding the fabric and the means for rotating the chuck not being shown, as they are well known in the art and constitute no part of my invention.

The stitching mechanism 12, is mounted on a carriage 13, which is in turn slidably adjustable on a base 14, by means of the usual hand wheel 15.

The stitching mechanism consists of a plate 16 bolted to the carriage 13 and having a pair of stitcher bearing arms 17 pivotally mounted thereon at 18. Suitable stopposts 19 are provided for limiting the degree of movement of the stitcher arms 17.

For the purpose of regulating the pressure of the stitchers and maintaining them in contact with the core, a plate 20 having an operating handle 21 is pivoted to the plate 16 at 22 and has two cam slots 23, in which upstanding lugs 24, one at the inner end of each stitcher bearing arm 17, are adapted to slide as the handle 21 is turned from right to left. Hence, as the handle 21 is thus turned the stitcher bearing arms 17 are swung on their respective pivots to increase or decrease the pressure of the stitchers on the rolls, and cause the stitchers to follow the contour of the core periphery.

To the other end of each arm 17 is pivoted a bifurcated or U shaped element 25, which carries a pair of circular discs 26 and 27, the latter being mounted on the opposite faces of a wedge shaped bearing 28 which is pivotally mounted between the bifurcations or legs of the U shaped element 25, on a suitable vertical journal bearing 29. The discs 26 and 27 are mounted so as to rotate on the bearing 28 and suitable antifriction devices may be provided to insure their easy rotation.

The pivot point formed by the journal 29 is arranged so as to be close to the core in order to give stability to the stitchers.

The discs 26 and 27 are of substantially the same diameter. They differ, however, in this respect; the disc 27 which is in reality the stitcher disc, has a beveled edge $27^a$, while the disc 26, which acts in the nature of a guiding disc, has a rounded edge $26^a$.

Figure 2:
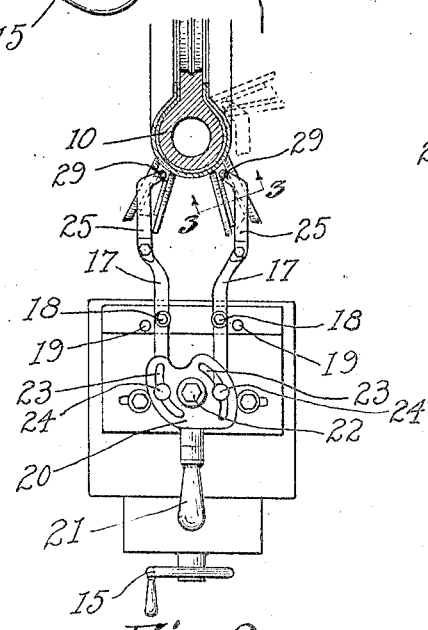
Figure 2 is a plan view showing the core and fabric thereon in horizontal section.
Figure 3:
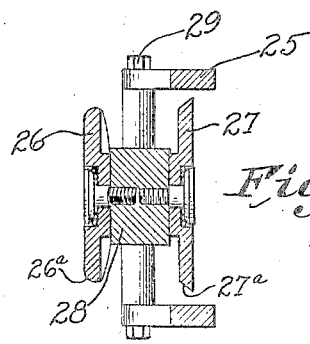
Figure 3 is a detail section of the stitching elements taken on line 3—3 of Figure 2.

The operation of my device is as follows:

A strip of fabric is first wound on the core 10 in the usual manner, and a tread roll, not shown, applied to roll down the tread portion. The hand wheel 15 is then manipulated to advance the carriage 13 toward the core, and bring the discs 26 and 27 into contact with the fabric as shown in Figure 2.

The purpose of the arrangement shown is particularly to maintain approximately the same angular relation between the stitcher disc and the fabric wound on the core so that the fabric is stitched down smoothly and with a uniform stretching thereof.

This function is secured by the guiding action of the disc 26, which, of course, bears a fixed angular relation to the opposite stitcher disc 27, so that as the carriage is advanced the stitcher also moves about the core pressing the fabric smoothly against the core—or previously laid fabric ply—with a force applied in such a direction outwardly as to properly stretch the fabric toward the base portion as it is applied. The stitcher is, moreover, automatically retained in the same angular relation to the circular portion of the peripheral section of the core, but the angle is necessarily changed somewhat as the stitcher leaves the circle. Further, the stitcher follows the form of the core into the bead portion of the tire, both before and after the application of the bead, (see the dotted lines in Fig. 2).

While I have shown and described a specific embodiment of my invention, it will be understood that changes and modifications may be made that come within the scope of the claims hereto appended, without in any way departing from the spirit of my invention as defined thereby.

What I claim is:

1. In an apparatus of the character described, a stitcher bearing element, a stitcher member revolubly mounted on said element, a guiding core-engaging member also mounted on said element, and means for pivotally supporting said element, the axis of the pivot extending intermediate the stitcher member and guiding member.

2. In an apparatus of the character described, a stitcher bearing element, a stitcher disc revolubly mounted on said element, a guiding disc also revolubly mounted on said element, and a bifurcated element for pivotally supporting said stitcher bearing element between the bifurcations of the bifurcated element.

3. In an apparatus of the character described, a stitcher bearing element, a stitcher disc revolubly mounted on said element, a guiding disc also revolubly mounted on said element, a bifurcated element for pivotally supporting said stitcher bearing element between the bifurcations of the bifurcated element, and means for operating said bifurcated element.

4. In an apparatus of the character described, a stitcher bearing element, a stitcher disc revolubly mounted on said element, a guiding disc also revolubly mounted on said element, a bifurcated element for pivotally supporting said stitcher bearing element between the bifurcations of the bifurcated element, and means for operating said bifurcated element, said means comprising an adjustable carriage to which said bifurcated element is connected.

5. In an apparatus of the character described, an adjustable carriage, pivoted arms connected thereto, a bifurcated element pivotally mounted on the end of each arm, a stitcher bearing element pivotally mounted on said bifurcated element, a revoluble stitcher, a guide carried by said stitcher bearing element, and means for adjusting the carriage.

6. In an apparatus of the character described, a revoluble core, a pivotally mounted stitcher bearing element, a revoluble stitcher disc, means for moving said stitcher disc around the peripheral portion of said core, and core engaging means adapted to automatically maintain the stitcher disc in substantially the same angular relation to said core during the stitching operation.

7. In an apparatus of the character described, a rotatable core, pivotally mounted stitcher bearing elements, a rotatable stitcher disc connected to each of said stitcher bearing elements, means for moving the stitcher bearing element transversely of the core periphery, and means adapted to follow the path of each stitcher disc to automatically maintain said discs in their proper angular relation with respect to the plane of the core during the stitching operation.

8. In an apparatus of the character described, a rotatable core, a rotatable stitcher element, means for moving the stitcher element transversely of the core periphery, and means adapted to follow the path of the stitcher element to automatically maintain said element at its proper angular relation with respect to the core during the stitching operation.

9. In an apparatus of the character described, a revoluble core, a pair of revoluble stitcher elements, means for moving said stitchers around the peripheral portion of said core, core engaging means operated in accordance with the position of the respective stitcher elements on the core for maintaining each stitcher element in substantially the same angular relation to said core as it moves around said core, and means for varying the pressure of the stitchers on the core.

10. In a tire building machine including a rotatable tire supporting core, a stitcher carrying arm adapted for movement transversely of the core, and a stitcher unit comprising a plurality of spaced rotatable discs mounted upon the arm to oscillate in unison with respect thereto about a common axis while in peripheral contact with a tire.

11. In a tire building machine including a rotatable supporting core and a reciprocable carriage, a stitcher carrying arm mounted upon the carriage and adapted for movement transversely of the core, and a stitcher unit comprising a plurality of spaced rotatable discs mounted upon the arm, the axes of rotation of the discs being arranged in fixed relative angular relation, said stitcher unit being pivotally mounted on the arm for free pivotal movement relative thereto during operation.

12. In a tire building machine including a rotatable tire supporting core and a reciprocable carriage, a stitcher carrying arm mounted upon the carriage and adapted for movement transversely of the core, and a stitcher unit comprising a plurality of spaced rotatable discs mounted upon the arm to oscillate in unison with respect thereto and about a common axis, the axes of rotation of the discs being arranged in relative angular relation.

13. In a tire building machine including a rotatable tire supporting core and a reciprocable carriage, a stitcher carrying arm mounted upon the carriage and adapted for movement transversely of the core, and a stitcher unit comprising a plurality of spaced rotatable discs mounted to oscillate in unison upon the arm about a common axis offset from their axes of rotation.

14. In a tire building machine including a rotatable tire supporting core and a reciprocable carriage, a stitcher carrying arm mounted upon the carriage and adapted for movement transversely of the core, and a stitcher unit comprising a plurality of spaced rotatable discs mounted upon the arm and having their respective planes of rotation arranged in relative angular relation, said stitcher unit being pivoted for free oscillatory movement relative to said arm during operation.

15. In a tire building machine including a rotatable tire supporting core and reciprocable carriage, a stitcher carrying arm mounted upon the carriage and adapted for movement transversely of the core, and a stitcher unit comprising a plurality of spaced rotatable discs adapted to oscillate in unison upon the arm about a common axis, the respective planes of rotation of the discs being arranged in relative angular relation.

16. In a tire building machine including a rotatable tire supporting core and a reciprocable carriage, a stitcher carrying arm mounted upon the carriage and adapted for movement transversely of the core, a stitcher unit comprising a plurality of rotatable discs arranged to oscillate in unison upon the arm about a common axis, the axes of rotation of the discs being arranged in relative angular relation and offset from said axis of oscillation.

In testimony whereof I have signed my name in the presence of two subscribing witnesses.

JOHN M. MYLROIE.

Witnesses:
    JOHN E. KEATING,
    E. C. LEADENHAM.